(12) United States Patent
Liu (10) Patent No.: US 7,826,211 B2
(45) Date of Patent: Nov. 2, 2010

(54) COMPUTER CARD RETENTION DEVICE

(75) Inventor: Zhao Zhi Liu, Sinwu Township (TW)

(73) Assignee: Flextronics AP, LLC, Broomfield, CO (US)

( * ) Notice: Subject to any disclaimer, the term of this patent is extended or adjusted under 35 U.S.C. 154(b) by 193 days.

(21) Appl. No.: 12/114,900

(22) Filed: May 5, 2008

(65) Prior Publication Data

US 2009/0273900 A1    Nov. 5, 2009

(51) Int. Cl.
*G06F 1/16* (2006.01)

(52) U.S. Cl. .................. 361/679.4; 361/724; 361/801; 312/223.1; 312/223.2

(58) Field of Classification Search ............... 361/679.4
See application file for complete search history.

(56) References Cited

U.S. PATENT DOCUMENTS

| | | | |
|---|---|---|---|
| 5,317,483 A * | 5/1994 | Swindler .................... 361/801 |
| 5,601,349 A | 2/1997 | Holt | |
| 5,694,291 A | 12/1997 | Feightner | |
| 5,936,835 A | 8/1999 | Astier | |
| 5,991,983 A | 11/1999 | Kohler et al. | |
| 6,138,839 A * | 10/2000 | Cranston et al. ......... 211/41.17 |
| 6,618,263 B1 | 9/2003 | Kin-Wing et al. | |
| 6,738,261 B2 * | 5/2004 | Vier et al. .................... 361/740 |
| 7,120,032 B2 * | 10/2006 | Lin et al. ..................... 361/801 |
| 7,265,997 B2 * | 9/2007 | Jing ........................... 361/801 |
| 7,558,055 B2 * | 7/2009 | Chen et al. ............. 361/679.32 |
| 7,573,704 B2 * | 8/2009 | Chen et al. ............. 361/679.32 |
| 7,576,999 B2 * | 8/2009 | Tang ........................... 361/801 |
| 7,635,267 B2 * | 12/2009 | Farrow et al. ................ 439/61 |
| 2005/0265005 A1 * | 12/2005 | Han et al. .................... 361/726 |
| 2007/0242442 A1 * | 10/2007 | Dai ............................. 361/801 |

* cited by examiner

*Primary Examiner*—Jayprakash N Gandhi
*Assistant Examiner*—Anthony Q Edwards
(74) *Attorney, Agent, or Firm*—James L. Johnson; Robert G. Crouch; Marsh Fischmann & Breyfogle LLP (57) ABSTRACT

A computer card retention device (60) is disclosed. One or more latching sections (88) are mounted on and movable relative to a computer card retainer (62). Each latching section (88) may be moved between latched and unlatched positions. Moving a latching section (88) to its unlatched position, and relative to the computer card retainer (62), allows the computer card retainer (62) to be moved from a card-restraining position to a card-access position. In one embodiment, each latching section (88) moves relative to the computer card retainer (62) along an axial path that is collinear or parallel with an axis (69) about which computer card retainer (62) may move between its card-restraining and card-access positions.

28 Claims, 6 Drawing Sheets

COMPUTER CARD RETENTION DEVICE

FIELD OF THE INVENTION

The present invention generally relates to the field of computer systems and, more particularly, to retainers that are used to secure one or more computer cards (e g., expansion cards) within a computer chassis.

BACKGROUND

An expansion card is generally a printed circuit board that may be incorporated into a computer to expand its functionality in at least some respect. Common expansion cards include graphics cards, video cards, sound cards, network cards, modem cards, and the like. In any case, an edge portion of the expansion card typically includes electrical contacts and may be slid into the relevant slot of an edge connector mounted on a motherboard. A bracket is typically mounted on the expansion card to facilitate the installation of the expansion card on the computer chassis. Brackets of this type may also include a connector to establish communication with an external device.

Installing expansion cards on a computer chassis is oftentimes a tedious and time-consuming procedure. One known installation procedure entails manually aligning the expansion cards with the chassis and then separately securing the individual expansion cards to the chassis using one or more screws. Production costs may be increased with this type of an installation procedure.

SUMMARY

The present invention is embodied by a computer card retention device, which includes a computer card retainer and a first latching section. The computer card retainer is adapted to be movably interconnected with a computer chassis so as to be able to move at least generally between card-restraining and card-access positions. The first latching section is a separate structure from the computer card retainer, and furthermore is movably mounted to the computer card retainer.

A number of feature refinements and additional features are applicable to the present invention. These feature refinements and additional features may be used individually or in any combination. Initially, any feature that is intended to be limited to a "singular" context or the like will be clearly set forth herein by terms such as "only," "single," "limited to," or the like. Merely introducing a feature in accordance with commonly accepted antecedent basis practice does not limit the corresponding feature to the singular (e.g., indicating that the computer card retention device includes "a latching section" alone does not mean that the computer card retainer includes only a single "latching section"). Moreover, any failure to use phrases such as "at least one" or the like also does not limit the corresponding feature to the singular (e.g., indicating that computer card retention device includes "a latching section" versus "at least one latching section" alone does not mean that the computer card retention device includes only a single "latching section").

The computer card retainer may be of any appropriate size, shape, and/or configuration, may be formed from any appropriate material or combination of materials, or both. The computer card retainer may be characterized as a press bracket or the like—a structure that may be "pressed" against one or more computer card assemblies (e.g., against a bracket fixed on one end of a computer card). In one embodiment, the computer card retainer is an elongated structure having a flat lower surface that interfaces with a flat surface of one or more computer card assemblies (e.g., its end bracket) when the computer card retention device is installed on a computer chassis and disposed in its card-restraining position.

The card-restraining position for the computer card retainer may be characterized as that which restrains movement, or at least limits the amount of movement, of one or more computer cards relative to a chassis on which the computer card retention device is installed. The card-access position for the computer card retainer may be characterized as that which should allow one or more computer cards to either be removed from and/or installed in an appropriate slot (e.g., a slot of an edge connector associated with a chassis on which the computer card retention device is installed). Any appropriate motion may be employed to change the computer card retainer between its card-restraining and card-access positions. In one embodiment, the computer card retainer may be moved at least generally about a first axis between its card-restraining and card-access positions when the computer card retention device is installed on a computer chassis. This first axis is subject to a number of characterizations, which apply individually or in any combination. One is that the first axis may extend in a common dimension with a length dimension of the computer card retainer (e.g., the computer card retainer may move at least generally about an axis that coincides with its length dimension). Another is that the first axis may extend in a common dimension with a maximum dimension of the computer card retainer (e.g., a maximum spacing between displaced and corresponding portions of the computer card retainer).

The computer card retention device may be adapted to dispose a pivot axis for the computer card retainer in a position that is in at least substantially orthogonal relation to a pair of primary surfaces of each computer card being secured by the computer card retention device when installed on a computer chassis. Any appropriate way of defining this pivot axis may be utilized, and the structure of the computer card retainer may be adapted accordingly. In one embodiment, the computer card may include first and second pivot pins that define a pivot axis for the computer card retainer when installed on a computer chassis. These first and second pivot pins may be disposed on or otherwise may be part of first and second ends, respectively, of the computer card retainer. These first and second ends may be characterized as being those oppositely disposed portions of the computer card retainer that are separated by a maximum spacing in relation to each pair of opposing portions of the computer card retainer. A separate pivot pin could also be used to pivotally interconnect the computer card retainer with the computer chassis. In any case and in one embodiment, the first latching section is movable along a first path that is at least substantially axial or linear in nature, and this first path is either collinear with the noted pivot axis for the computer card retainer or it is at least substantially parallel with this pivot axis for the computer card retainer.

The first latching section may be of any appropriate size, shape, configuration, and/or type. In one embodiment, the first latching section secures one end of the computer card retainer when in its latched position and with the computer card retention device being installed on a computer chassis. In another embodiment and as will be discussed in more detail below, the computer card retention device may include a second latching section. The first and second latching sections may secure opposite ends of the computer card retainer when in their respective latched positions and with the computer card retention device being installed on a computer chassis. The first and second latching sections could be associated with separate structures (e.g., separate "anchor" sections), or could be associated with a common structure (e.g., a common "anchor" section).

The first latching section is movably mounted to the computer card retainer. Although the first latching section may move relative to the computer card retainer in at least one dimension, relative motion between the first latching section and computer card retainer may be limited or restrained in at least one other dimension. The first latching section may be characterized as being slidably interconnected with the computer card retainer. In one embodiment, the computer card retainer includes a slot, and the first latching section is disposed within and is movable along the slot (e.g., along the length dimension of the slot). This slot may be formed on a side of the computer card retainer that is opposite of that which interfaces with one or more computer card assemblies (e.g., their respective end brackets) when the computer card retention device is installed on a computer chassis and when the computer card retainer is moved to its card-restraining position. The slot may be configured such that the first latching section may not be "pulled out" of the slot in a direction that is orthogonal to the length dimension of the slot (although the first latching section could move a small distance orthogonally away from the slot before being restrained by rails or other structures that define the slot).

The computer card retention device may include a first biasing element that is interconnected with the first latching section in any appropriate manner. This first biasing element may be of any appropriate size, shape, and/or configuration (e.g., in the form of a spring or other compliant structure, such as an elastomeric element), and is subject to a number of characterizations. One is that the first biasing element may bias the first latching section toward a latching or latched position (e.g., to restrain/limit motion between the computer card retainer and a chassis on which the computer card retention device is installed; to "lock" the computer card retainer in at least somewhat of a fixed position relative to such a chassis). Another is that the first biasing element may be integrally formed with the first latching section—so that there is no joint of any kind between the first biasing element and the first latching section. However, the first biasing element and the first latching section could be separate structures (e.g., the first biasing element could be a separate spring, elastomeric element, or the like that exerts a force on the first latching section to bias the same toward its latching position). Multiple first biasing elements could also be utilized and disposed in any appropriate arrangement.

The first biasing element may be elastically deformed or otherwise compressed to move the first latching section from a latching or latched position to an unlatching or unlatched position, at which time the computer card retainer may be moved from its card-restraining position to its card-access position. Stated another way, moving the first latching section from its latched position to its unlatched position may increase the potential energy (e.g., stored or internal energy) of the first biasing element. The elasticity, spring force, or potential energy of the first biasing element may be used to move the first latching section back from its unlatching or unlatched position to its latching or latched position (e.g., to "lock" the computer card retainer in its card-restraining position). In one embodiment, the elasticity, spring force, or potential energy of the first biasing element provides the sole force to return the first latching section from its unlatching or unlatched position to its latching or latched position.

The computer card retention device may further include a second latching section that is separate from and movably mounted to the computer card retainer. Generally, each of the various features addressed herein with regard to the first latching section are equally applicable to the second latching section. In one embodiment, each of the first and second latching sections are separately movable between latching and unlatching positions, where the first and second latching sections are moved toward each other when moving to their respective unlatching positions, and where the first and second latching sections move away from each other when moving to their respective latching positions. At least one biasing element may bias each of the first and second latching sections toward their respective latching positions. The first and second latching sections may be associated with separate structures, or the first and second latching sections may be part of a common structure.

The computer card retention device may be used by any appropriate computer, and may be configured for use with any appropriate type and number of computer cards (e.g., expansion cards). Computer cards may be in the form of thin, plate-like structures having a pair of oppositely disposed primary surfaces. Any appropriate number of electrical components may be appropriately mounted on either or each of these surfaces, one or more circuits may be formed on either or each of these surfaces, or both. One edge portion of the computer card may include one or more electrical contacts that may be seated into an appropriate slot (e.g., a slot formed in an edge connector or the like, that similarly incorporates one or more electrical contacts). A bracket may be provided on an end of a computer card, and this end bracket may interface with an appropriate supporting surface of a computer chassis. The computer card retainer may be moved into its card-restraining position to simultaneously engage the end bracket of one or more computer cards so that these cards cannot then be removed from their respective slot.

A computer may include any appropriate number of computer cards that are spaced from each other and that are disposed in at least substantially parallel relation. The computer card retention device may have its computer card retainer be movable at least generally about a first axis between its card-restraining and card-access positions, where this first axis is disposed in at least substantially orthogonal relation to the various computer cards that are simultaneously secured by the computer card retention device when in its card-restraining position.

Each computer card to be secured by the computer card retention device may have a pair of oppositely disposed primary surfaces, where a primary surface of one computer card will face the primary surface of an adjacent computer card. The computer card retention device may have its computer card retainer be movable at least generally about a first axis between its card-restraining and card-access positions, where this first axis is disposed in at least substantially orthogonal relation to the primary surfaces of the computer cards that it is securing.

DETAILED DESCRIPTION

Figure 1A:
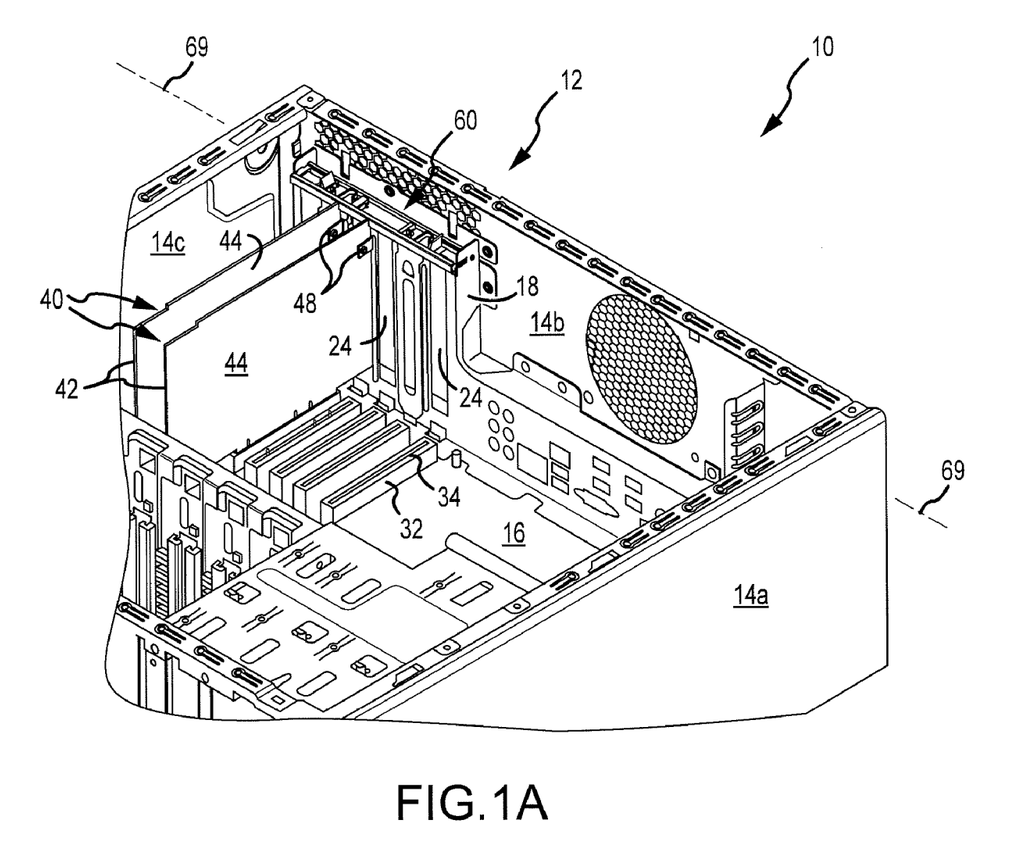
FIG. 1A is a perspective view of a computer system that utilizes one embodiment of a computer card retention device.
Figure 1B:
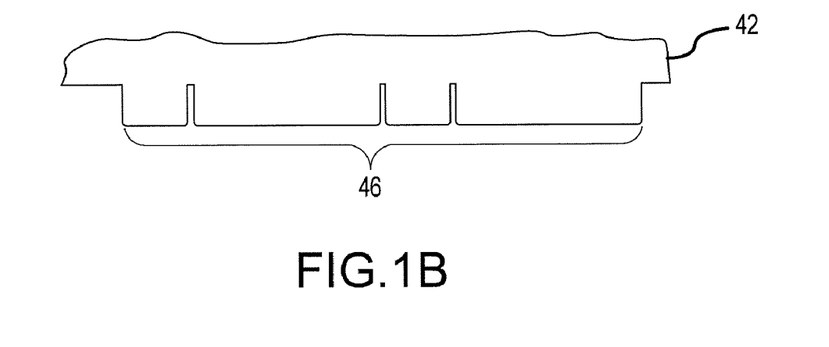
FIG. 1B is an enlarged, plan view of an electrical contact section of one of the computer cards show in FIG. 1A.

FIGS. 1A and 1B illustrate a computer system 10 having a chassis 12. Three chassis walls 14*a*, 14*b*, and 14*c* are shown for the chassis 12, along with a base 16. The chassis 12 may be of any appropriate size, shape, and/or configuration, and generally may be characterized as an enclosure or casing for a computer. A card bracket 18 is mounted on the chassis wall 14*b* in any appropriate manner (e.g., via one or more screws or other appropriate fasteners), and includes one or more card bays or slots 24 that are spaced along the length dimension of the chassis wall 14*b*. The card bracket 18 may utilize any appropriate number of card bays 24. Each card bay 24 of the card bracket 18 may receive what may be characterized as a computer card assembly 40. Two computer card assemblies 40 are shown in the FIG. 1A configuration.

Each computer card assembly 40 includes a computer card 42 of any appropriate size, shape, configuration, and/or type (e.g., an expansion card), along with a card-mounting bracket 48 that is mounted on an end of the computer card 42 in any appropriate manner (e.g., via one or more screws or other appropriate fasteners). The lower portion of each computer card 42 includes what may be characterized as an electrical contact section 46. The electrical contact section 46 includes one or more electrical contacts and may be disposed within a card slot 34 of an edge connector 32 associated with the chassis 12. Each computer card assembly 40 is installed in the card slot 34 of a separate edge connector 32. Each edge connector 32 may be mounted on a motherboard (not shown), and its card slot 34 includes one or more electrical contacts for establishing an electrical connection with those electrical contacts of the associated computer card 42. Therefore, each edge connector 32 may electrically interconnect its corresponding computer card 42 with a motherboard or another appropriate portion of the computer system 10.

Each computer card 42 is generally a thin, plate-like structure (e.g., a printed circuit board), having a pair of primary surfaces 44 on which one or more components may be mounted in any appropriate manner, on which one or more circuits may be formed, and the like. The computer cards 42, more specifically their primary surfaces 44, are positioned at least substantially parallel to each other. Adjacent computer cards 42 are appropriately spaced from each other. In one embodiment, reference planes containing the primary surfaces 44 of the various computer cards 42 are orthogonal to a pivot axis 69 for a computer card retention device 60. That is, the primary surfaces 44, and in general the computer cards 42, are disposed in at least substantially orthogonal relation to the noted pivot axis 69.

The computer card retention device 60 is mounted on and movable relative to (e.g., movably interconnected with) the card bracket 18. Generally, the computer card retention device 60 may be moved at least generally between at least two positions—a card-access position where one or more computer card assemblies 40 may be installed in or removed from their corresponding edge connector 32, and a card-restraining position where each computer card assembly 40 that is positioned within a card bay 24 of the card bracket 18 is simultaneously engaged by the computer card retention device 60 (e.g., such that the computer card assembly 40 may not be removed from its corresponding edge connector 32 at this time).

Figure 2:
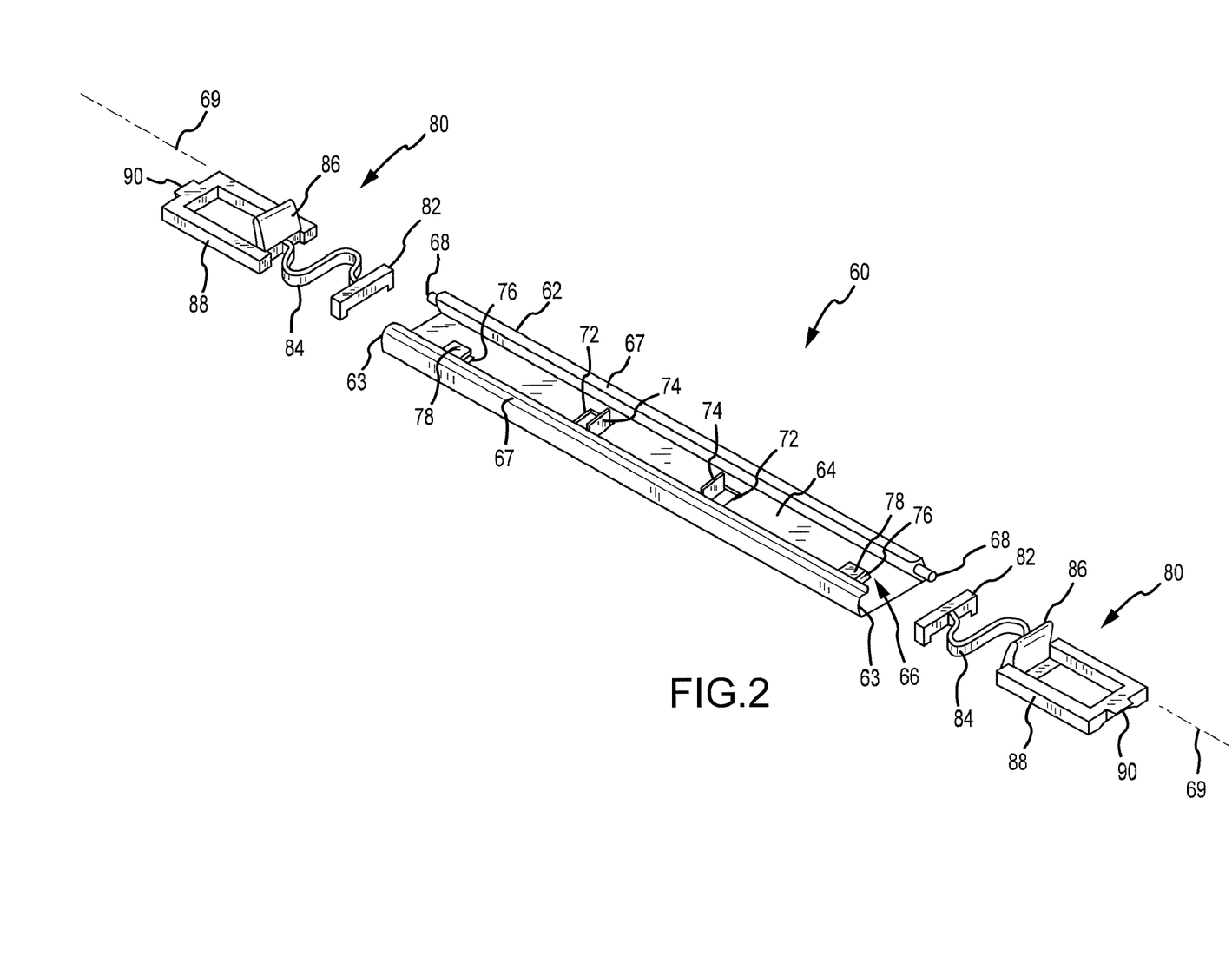
FIG. 2 is an exploded, perspective view of the computer card retention device from the computer system of FIG. 1A.
Figures 3A, 3B:
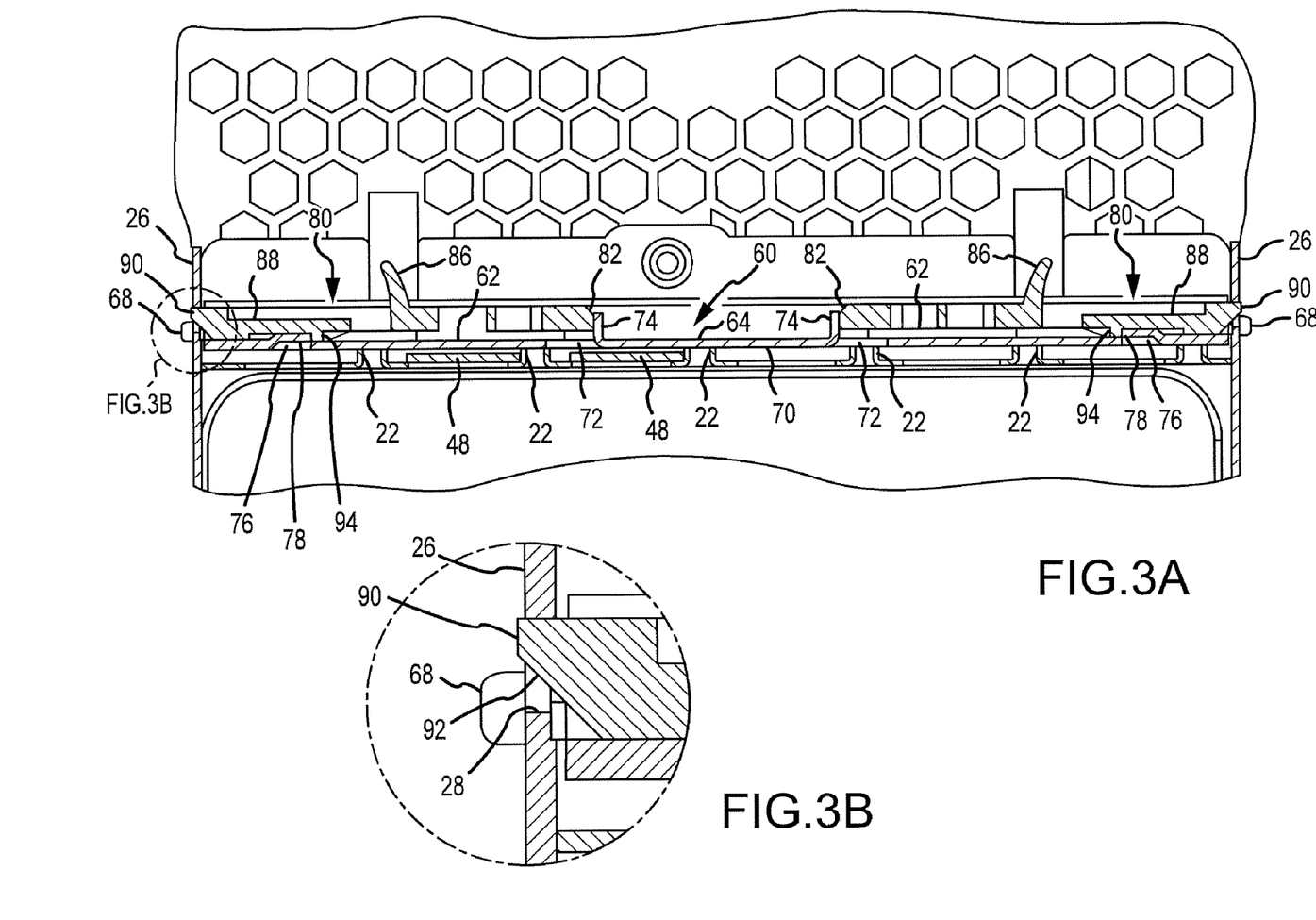
FIG. 3A is a cross-sectional view of the computer system of FIG. 1, taken along the length dimension of and through the computer card retention device.
FIG. 3B is an enlarged view of the dashed region shown in FIG. 3A.

The computer card retention device 60 is shown in detail in FIGS. 2, 3A and 3B. Components of the computer card retention device 60 include a computer card retainer 62 (e.g., a "press bracket") and a pair of latch assemblies 80. Each of the computer card retainer 62 and the individual latch assemblies 80 may be formed from any appropriate material or combination of materials. In the illustrated embodiment, the computer card retainer 62 and each of the latch assemblies 80 are each (i.e., all three components) integral structures (e.g., no joints). It should be noted that the cross-sectional view presented by FIG. 3A is of the computer card retention device 60 in its card-restraining position, and is taken along the length dimension of the computer card retainer 62 (which at least generally coincides with the axis 69 about which the computer card retainer 62 may move).

The computer card retainer 62 is an elongated structure that extends between a pair of opposing ends 63. The spacing between the ends 63 defines the length dimension for the computer card retainer 62, and is also the largest spacing between any pair of corresponding portions of the computer card retainer 62. Any appropriate spacing between the ends 63 may be utilized. In any case, a pivot pin 68 is provided on each end 63 of the computer card retainer 62. Each pivot pin 68 is disposed within a corresponding pivot pin aperture 30 on an end wall 26 of the pivot bracket 18 (e.g., FIG. 4A). The computer card retainer 62 is movable at least generally about the axis 69 defined by these two pivot pins 68. Therefore, the computer card retainer 62 may be characterized as being movable (e.g., pivotable) at least generally about its length dimension in at least one embodiment. It should be appreciated that a separate pivot pin could be used to pivotally interconnect the computer card retainer 62 with the chassis 12 (not shown). Any way of pivotally interconnecting the computer card retention device 60 with the chassis 12 may be utilized.

The computer card retainer 62 includes an upper surface 64 and an oppositely disposed lower surface 70. In the illustrated embodiment, the surface 70 is flat. Other contours may be appropriate for the surface 70. A pair of rails 67 are provided for the computer card retainer 62 to define a slot 66 on its upper surface 64. Each of the noted latch assemblies 80 includes a latching section 88 that is movably received within this slot 66. Each latching section 88 is mounted on and movable relative to the computer card retainer 62 along its length dimension. In one embodiment, the latching sections 88 are each movable along an axial path that is collinear with or parallel to the axis 69 about which the computer card retainer 62 may move between its card-restraining and card-access positions.

One pair of apertures 72 extends entirely through the computer card retainer 62 to define a pair of latch assembly anchors 74. Another pair of apertures 76 extends entirely through the computer card retainer 62 to define a pair of travel limiters 78. One latch assembly anchor 74 and one travel limiter 78 is provided for each latch assembly 80. That is, each latch assembly 80 has its own latch assembly anchor 74 and travel limiter 78. The latch assembly anchor 74 and the travel limiter 78 that is disposed between this latch assembly anchor 74 and the adjacent-most end 63 of the computer card retainer 62 are used by one latch assembly 80.

Each latch assembly 80 includes an end section 82 that abuts its associated latch assembly anchor 74 of the computer card retainer 62. A biasing element or compliant section 84 extends from this end section 82 to a latching section 88 of the latch assembly 80. The latching section 88 includes a head 90 having a chamfered or beveled surface 92. A handle 86 extends from the latching section 88 and may be engaged to move the latching section 88 relative to its corresponding end section 82. A travel limiter 94 is provided on a lower surface of the latching section 88. This travel limiter 94 of the latching assembly 80 may engage its corresponding travel limiter 78 on the computer card retainer 62 to limit the amount that its latching section 88 may move in the direction of its latching position.

The handle 86 of each latch assembly 80 may be moved at least generally toward its corresponding end section 82 to move its latching section 88 within the slot 66 of the computer card retainer 62 from a latched position to an unlatched position. In the illustrated embodiment, this is provided by an elastic deformation or deflection of the corresponding biasing element 84. Any appropriate biasing element 84 or combination of biasing elements 84 may be disposed between an end section 82 and its corresponding latching section 88 for each latch assembly 80 (e.g., a compressible spring), and reducing the spacing between a latching section 88 and its corresponding end section 82 may be characterized as increasing a spring force in or a potential energy of the biasing element 84. In the illustrated embodiment, the latch assembly 80 is an integrally-formed structure (e.g., no joints of any kind in its structure), although each latch assembly 80 could be also be a multi-part structure (e.g., a separate end section 82, one or more separate biasing elements 84, and a separate latching section 88). In any case, the "stored energy" within the biasing element 84 may be used to move the associated latching section 88 back to its latched position, and may in fact provide the sole force for returning the latching section 88 to its latched position.

Each latch assembly 80 may be installed on the computer card retainer 62 in the same general manner. The latch assembly 80 may be introduced into the slot 66 from its corresponding end 63 of the computer card retainer 62, and may then be advanced along the slot 66 (e.g., in an axial direction) toward the opposite end 63 of the computer card retainer 62 to position its end section 82 against its corresponding latch assembly anchor 74. Although the slot 66 accommodates this movement along its length dimension, the rails 67 limit or restrain movement of the latch assembly 80 in a direction that is orthogonal to the length dimension of the slot 66. As such, the rails 67 should preclude the latch assemblies 80 from being "pulled out" of the slot 66 other than through a corresponding open end of the slot 66.

Once installed on the computer card retainer 62 in the above-noted manner, each latching section 88 may be independently moved between its latched and unlatched positions. Each latching section 88 may move along the slot 66 on at least a generally axial path. In one embodiment, each latching section 88 moves at least generally along an axial path between its latched and unlatched positions, where this axial path is either collinear with or parallel to the pivot axis 69 of the computer card retention device 60.

Although the latching sections 88 are illustrated as being associated with separate latch assemblies 80, the latching sections 88 may be associated with a common latch assembly (not shown). For instance, one or more biasing elements 84 could extend from each latching section 88 to a common end section 82 that is disposed between the two latching sections 88. Such a common end section 82 may or may not need to be anchored relative to the computer card retainer 62.

Figure 4A:
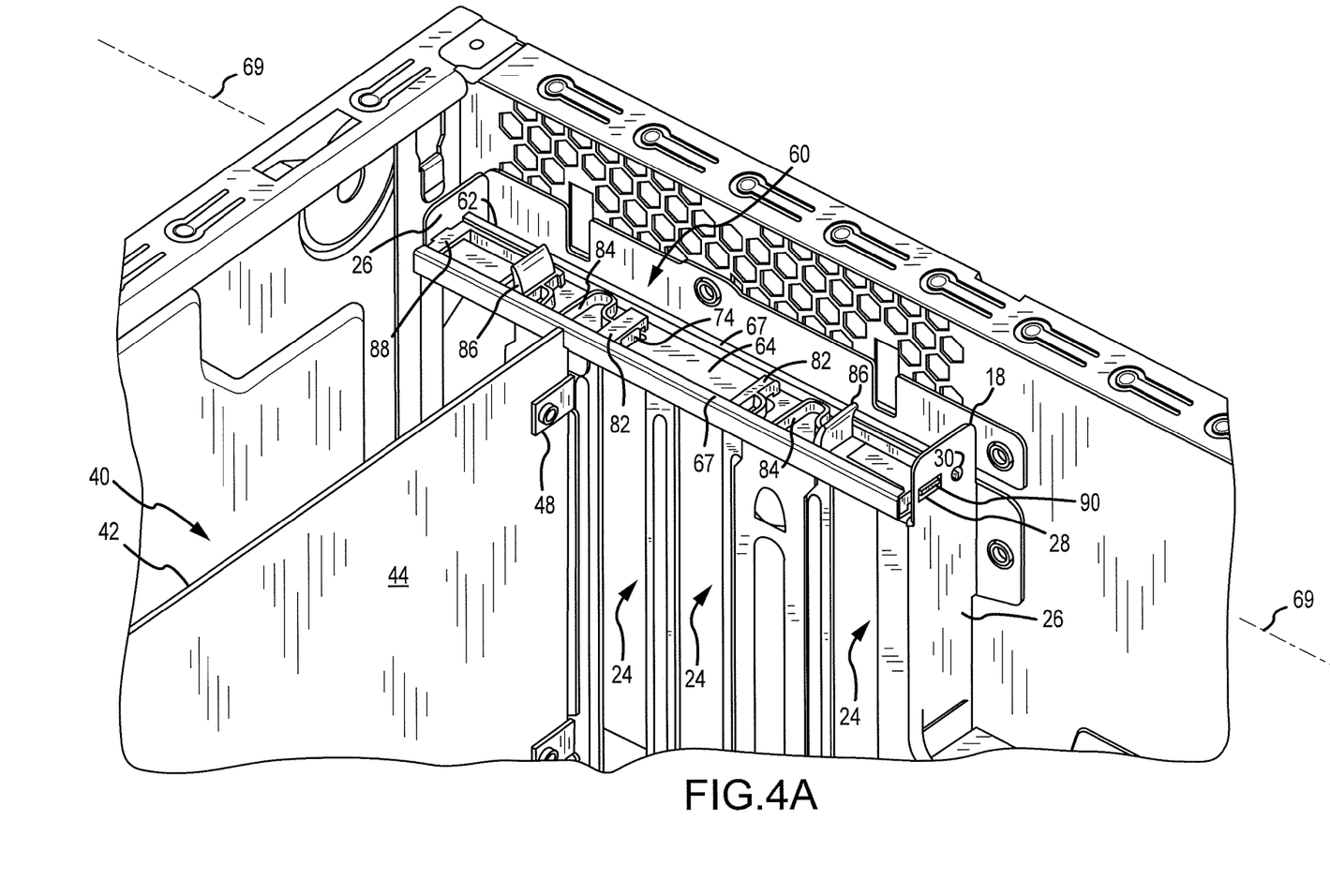
FIG. 4A is an enlarged, perspective view of the computer system of FIG. 1A, showing a single computer card assembly and with the computer card retention device in its card-restraining position.
Figure 4B:
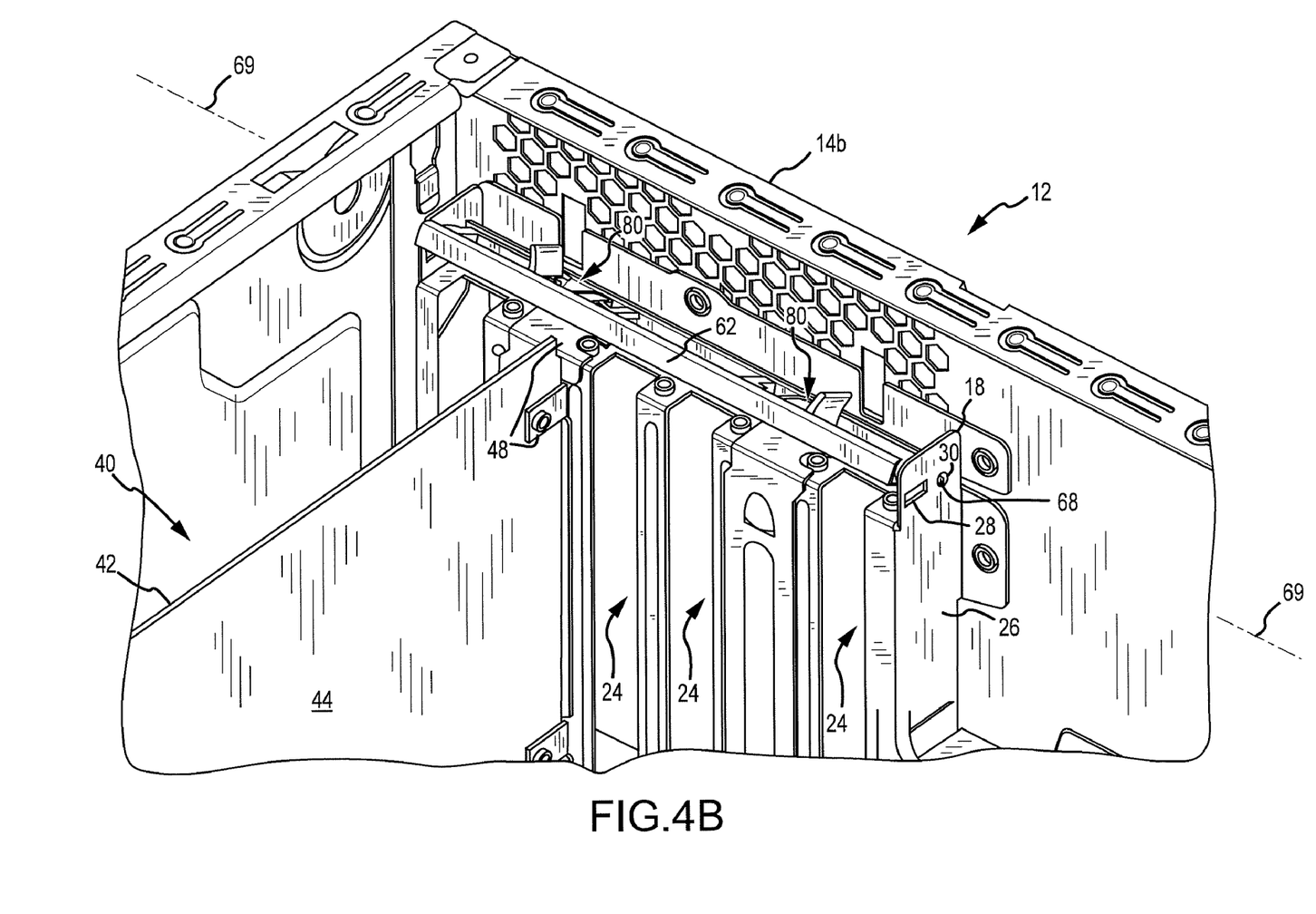
FIG. 4B is an enlarged, perspective view of the computer system of FIG. 1A, showing a single computer card assembly and with the computer card retention device in an intermediate position between its card-restraining position and its card-access position.
Figure 4C:
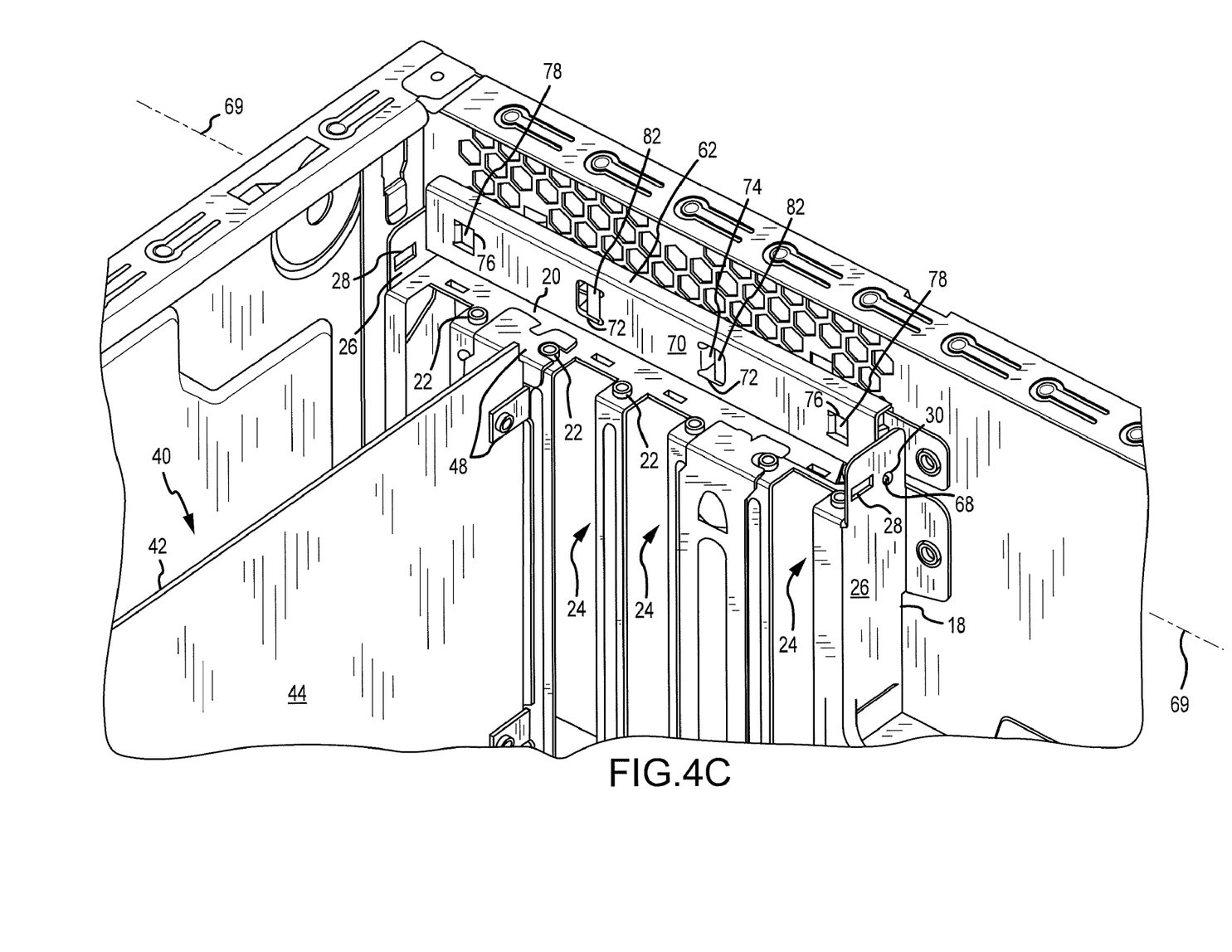
FIG. 4C is an enlarged, perspective view of the computer system of FIG. 1A, showing a single computer card assembly and with the computer card retention device in its card-access position.

Three different positions of the computer card retention device 60 are shown in FIGS. 4A-C. FIG. 4A shows the computer card retention device 62 in its card-restraining position. Note that the pivot pins 68 on the two ends 63 are disposed within pivot pin apertures 30 on each of the end walls 26 of the card bracket 18. Also note that the head 90 of each latching member 80 is disposed within its corresponding latching slot 28 on an end wall 26 of the card bracket 18. This provides a "latched" position for each latch assembly 80, as well as for the entire computer card retention device 60. The biasing element 84 of each latch assembly 80 biases its corresponding latching section 88 toward the latched position shown in FIG. 4A (and also shown in FIG. 3).

The computer card retainer 62 may be moved from the card-restraining position of FIG. 4A by unlatching each of the latching sections 88 from the card bracket 18. In this regard, the handle 86 of each latch assembly 80 may be moved at least generally toward the other latch assembly 80 to unlatch the corresponding latching section 88 from the card bracket 18. More specifically, moving the handle 86 of each latch assembly 80, at least generally in the direction of the other latch assembly 80, will move its corresponding latching section 88 at least generally along an axial path within the slot 66 of the computer card retainer 62 to retract its corresponding head 90 out of its corresponding latching slot 28 on the end wall 26 of the card bracket 18. A user may simultaneously grasp each of the handles 86 with one hand and move the same at least generally toward one another (e.g., to reduce the spacing between the handles 86, to thereby reduce the spacing between the latching sections 88) to unlatch the computer card retention device 60 from the card bracket 18. Thereafter, the computer card retainer 62 may be pivoted at least generally about its pivot pins 68 (e.g., about pivot axis 69) toward its card-access position. As previously noted and in one embodiment, the latching sections 88 of each latching member 80 move along an at least substantially axial path that is collinear or parallel with the pivot axis 69 for the computer card retention device 60.

FIG. 4B shows the computer card retention device 60 after being moved from its card-restraining position of FIG. 4A to a representative intermediate position between this card-restraining position and a card-access position, which is shown in FIG. 4C. Again, this is provided by pivoting the computer card retention device 60 at least generally about the pivot axis 69. Once the computer card retention device 60 has been pivoted a sufficient distance, the handles 86 may be released, as the heads 90 of the latching sections 88 should now be engaged with and movable along the "inner surface" of the corresponding end wall 26. That is, the heads 90 of the latching sections 88 should now be positioned sufficiently out of their respective latching slots 28 at this time to allow their respective handles 86 to be released.

FIG. 4C shows the card-access position for the computer card retention device 60. Note that the card bracket 18 includes a plurality of bosses 22 on a surface 20 that supports a corresponding portion of the card-mounting bracket 48 of each of the various computer card assemblies 40. A portion of each card-mounting bracket 48 is positioned on the surface 20 of the card bracket 18 between an adjacent pair of bosses 22.

One or more computer card assemblies 40 may be installed on the chassis 12, removed from the chassis 12, or both with the computer card retention device 60 in the card-access position of FIG. 4C. The computer card retention device 60 may of course be pivoted back from the card-access position of FIG. 4C to the card-restraining position of FIG. 4A. In this regard, it should be noted that a user may simply "push down" on the computer card retainer 62. The handles 86 need not be moved toward each other to move the computer card retention device 60 back to the card-restraining position of FIG. 4A. Once the latching sections 88 are properly aligned with their corresponding latching slot 28 on the card bracket 18, their corresponding biasing element 84 should move the corresponding latching section 88 back into their respective latching slot 28 of the card bracket 18—the latched position for the computer card retention device 60.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A computer card retention device, comprising:
   a computer card retainer adapted to be movably interconnected with a computer chassis for movement between card-restraining and card-access positions, wherein said computer card retainer comprises first and second ends, and wherein a spacing between said first and second ends defines a maximum dimension of said computer card retainer; and
   a first latch assembly that is separate from said computer card retainer, and furthermore that comprises a first end section and a first latching section that are interconnected, wherein said first end section is mounted to said computer card retainer between said first and second ends of said computer card retainer, and wherein said first latching section is movably mounted to said computer card retainer.

2. The computer card retention device of claim 1, wherein said computer card retainer is movable at least generally about a first axis between said card-restraining and card-access positions when said computer card retention device is installed on a computer chassis, wherein said first latching section is movable along said computer card retainer on a first path that is at least substantially axial, and wherein said first path is one of at least substantially collinear or at least substantially parallel with said first axis.

3. The computer card retention device of claim 2, wherein said first axis extends in a common dimension with a length dimension of said computer card retainer coinciding with a spacing between said first and second ends of said computer card retainer.

4. The computer card retention device of claim 2, wherein said first axis extends in common dimension with said maximum dimension of said computer card retainer.

5. The computer card retention device of claim 1, wherein said computer card retention device is adapted to dispose a pivot axis for said computer card retainer at least substantially orthogonal to a pair of primary surfaces of each computer card to be secured by said computer card retention device when said computer card retention device is installed on a computer chassis, wherein said first latching section is movable along said computer card retainer on a first path that is at least substantially axial, and wherein said first path is one of at least substantially collinear or at least substantially parallel with said pivot axis.

6. The computer card retention device of claim 1, wherein said first latching section is slidably interconnected with and is movable along said computer card retainer in a dimension coinciding with a spacing between said first and second ends of said computer card retainer.

7. The computer card retention device of claim 1, wherein said computer card retainer comprises a slot that extends in a dimension coinciding with a spacing between said first and second ends of said computer card retainer, wherein said first latching section is movably disposed within said slot.

8. The computer card retention device of claim 7, wherein said computer card retainer further comprises a computer card retention surface, wherein said slot and said computer card retention surface are disposed oppositely of each other.

9. The computer card retention device of claim 1, further comprising:
   a first biasing element interconnected with said first latching section, wherein said first biasing element is located between said first end section and said first latching section.

10. The computer card retention device of claim 9, wherein said first biasing element biases said first latching section toward a latching position.

11. The computer card retention device of claim 9, wherein said first biasing element is integrally formed with said first latching section.

12. The computer card retention device of claim 1, further comprising:
   a second latching section separate from and movably mounted to said computer card retainer.

13. The computer card retention device of claim 12, wherein said computer card retainer comprises a pivot axis, wherein said first latching section is movable along said computer card retainer on a first path that is at least substantially axial, wherein said first path is one of at least substantially collinear or at least substantially parallel with said pivot axis, wherein said second latching section is movable along said computer card retainer on a second path that is at least substantially axial, and wherein said second path is one of at least substantially collinear or at least substantially parallel with said pivot axis.

14. The computer card retention device of claim 12, wherein said first and second latching sections are each slidably interconnected with and are movable along said computer card retainer in a dimension coinciding with a spacing between said first and second ends of said computer card retainer.

15. The computer card retention device of claim 12, wherein said computer card retainer comprises a slot that extends in a dimension coinciding with a spacing between said first and second ends of said computer card retainer, and wherein said first latching section and said second latching section are each movably disposed within said slot.

16. The computer card retention device of claim 12, wherein each of said first and second latching section are movable between latching and unlatching positions, wherein said first and second latching sections move toward each other when moving to their respective said unlatching positions, and wherein said first and second latching sections move away from each other when moving to their respective said latching positions.

17. The computer card retention device of claim 12, further comprising:

a first biasing element interconnected with said first latching section; and a second biasing element interconnected with said second latching section.

18. The computer card retention device of claim 17, wherein said first biasing element biases said first latching section toward a first latching position, and wherein said second biasing element biases said second latching section toward a second latching position.

19. The computer card retention device of claim 12, further comprising:

a second latch assembly comprising a second end section and said second latching section, wherein said second end section and said second latching section are interconnected, wherein said second end section of said second latch assembly is located between said first and second ends of said computer card retainer, wherein said second end section of said second latch assembly is located between said second end of said computer card retainer and said first end section of said first latch assembly, and wherein said first end section of said first latch assembly is located between said first end of said computer card retainer and said second end section of said second latch assembly.

20. The computer card retention device of claim 12, wherein said first end section of said first latch assembly is also interconnected with second latching section, and wherein said first end section is located between said first and second latching sections.

21. A computer comprising:

a first computer card; and the computer card retention device of claim 1, wherein said computer card retainer is movable at least generally about a first axis between said card-restraining and said card-access positions, wherein said computer card retainer secures said first computer card when in said card-restraining position, wherein said first computer card is removable with said computer card retainer being in said card-access position, and wherein said first axis is at least substantially orthogonal to said first computer card.

22. The computer of claim 21, wherein said first latching section is movable along said computer card retainer on a first path that is at least substantially axial, and wherein said first path is one of at least substantially collinear or at least substantially parallel with said first axis.

23. The computer of claim 21, wherein said card retention device further comprises a first biasing element interconnected with said first latching section, wherein said first latching section is movable between latching and unlatching positions, and wherein said first biasing element biases said first latching section toward said latching position.

24. The computer of claim 21, wherein said card retention device further comprises a second latching section, wherein each of said first and second latching sections are movable between latching and unlatching positions, wherein said first and second latching sections move toward each other when moving to their respective said unlatching positions, and wherein said first and second latching sections move away from each other when moving to their respective said latching positions.

25. The computer card retention device of claim 1, wherein said first latching section is movable along said computer card retainer in a dimension coinciding with a spacing between said first and second ends of said computer card retainer.

26. The computer card retention device of claim 1, wherein said computer card retainer undergoes a first motion to change between said card-restraining position and said card-access position, wherein said first latching section is movable relative to said computer card retainer between latching and unlatching positions, and wherein said first latching section also undergoes said first motion by being movably mounted to said computer card retainer.

27. The computer card retention device of claim 1, wherein said first latching section is movable relative to said computer card retainer between latching and unlatching positions, wherein said first latching section extends beyond said first end of said computer card retainer when in said latching position, and wherein unlatching position comprises said first latching section being located between said first and second ends of said computer card retainer.

28. A computer card retention device, comprising:

a computer card retainer adapted to be movably interconnected with a computer chassis for movement between card-restraining and card-access positions;

a first latching section separate from and movably mounted to said computer card retainer; and a second latching section separate from and movably mounted to said computer card retainer, wherein each of said first and second latching sections are movable between latching and unlatching positions, wherein said first and second latching sections move toward each other when moving to their respective said unlatching positions, and wherein said first and second latching sections move away from each other when moving to their respective said latching positions.

* * * * *